July 23, 1935. J. W. ROSS 2,009,017
PNEUMATIC GLASS FEEDER
Filed June 22, 1932
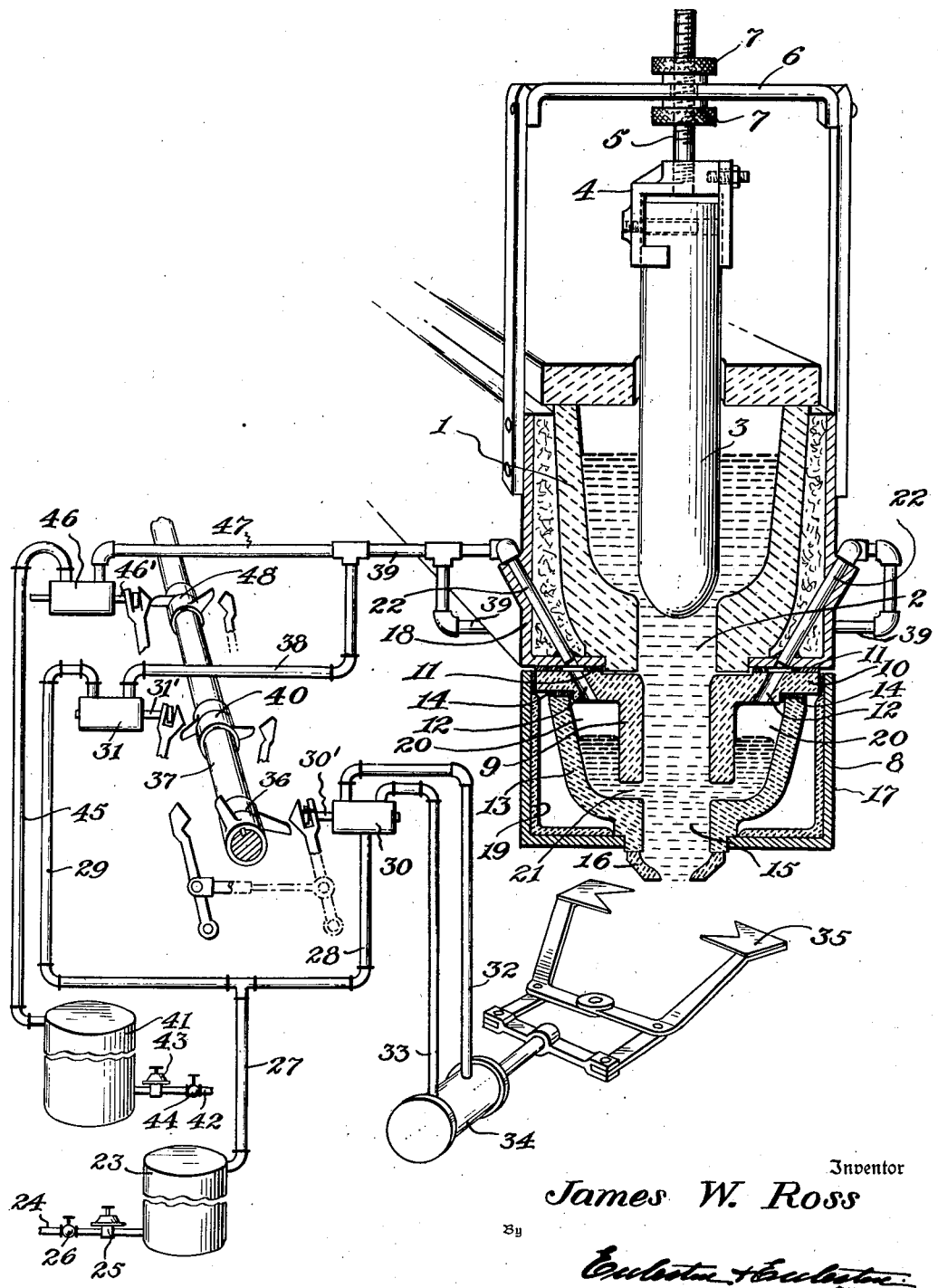
Inventor
James W. Ross
By
Culberton Hculberton
Attorneys Patented July 23, 1935

2,009,017

UNITED STATES PATENT OFFICE 2,009,017

PNEUMATIC GLASS FEEDER

James W. Ross, Washington, Pa., assignor to Hazel-Atlas Glass Company, Wheeling, W. Va., a corporation of West Virginia Application June 22, 1932, Serial No. 618,764

8 Claims. (Cl. 49—55)

The invention relates to glass feeders of the general type disclosed by the patent to Hitchcock No. 805,068, in which the charges are formed in suspension by alternately increasing and decreasing the pressure of the air on the surface of the glass.

One of the objects of the present invention is to provide an apparatus in which the alternate plus and minus pressures will have a more direct or more positive effect upon the glass, whereby the formation of the charges is under better control.

Another object of the invention is to provide an apparatus in which repairs can be made with the least possible loss of time and production, in the event of breakage of parts.

The present invention includes numerous other material advances over all previously known feeders, as will be apparent to those skilled in the art, from the following description taken in connection with the accompanying drawing, in which:

The figure represents a vertical transverse section through the feeder proper; the vacuum and pressure lines, the timer for controlling the application of vacuum and pressure, the shears, etc., being represented diagrammatically.

Referring to the drawing in more detail, numeral 1 indicates the front end, or nose block, of a conventional flow spout through which molten glass flows from a glass tank (not shown). The flow spout is preferably provided with ordinary burners (not shown) for regulating the temperature of the glass; and the bottom of the nose block is provided with the usual flow orifice 2.

For the purpose of controlling and regulating the flow of glass through the flow orifice 2, a stationary plug 3 is mounted in vertical alignment with the flow orifice. The plug is adjusted vertically by any desired mechanism. In the particular device illustrated, the upper end of the plug is removably mounted in a holder 4, from which holder a threaded rod 5 projects upwardly. The upper portion of the rod extends loosely through an opening in a bracket 6 carried by the flow spout, and nuts 7, 7 are threaded on the rod above and below the bracket. It will be apparent that by the rotation of these nuts in the appropriate direction the plug may be raised or lowered to the desired extent, thereby regulating and controlling the volume flow of glass through the flow orifice 2. The stationary, vertically adjustable plug is well known, having been used for many years in the Brooke feeder.

Arranged directly below the flow spout 1 is what may be termed a supplemental flow spout, referred to generally by numeral 8. It is to be particularly noted that the supplemental flow spout is arranged directly below the main flow spout, so that the glass is free to flow by gravity from the main flow spout into the supplemental flow spout; the volume flow being regulated by adjusting the plug 3, as described above. As will appear hereinafter, the supplemental flow spout can be quickly removed and replaced as a unit. This unit, which comprises several parts, will now be described.

Numeral 9 indicates a tubular member of refractory material which is arranged below the flow orifice; the passage through this tubular member being preferably of substantially the same size as, or slightly smaller than, the flow orifice; so that it in effect constitutes a continuation of the flow orifice. The upper end of the tubular member is provided with a flange 10 of substantial width; and in the preferred form illustrated herein packing is provided between this flange 10 and the bottom of the flow spout, as indicated by numeral 11, whereby an airtight connection is formed between these parts. The flange is provided with passages 12, for a purpose to appear hereinafter.

The tubular member 9 is enclosed within a container or bowl 13 which is also, of course, made of refractory material. Packing 14 is arranged between the bottom of the flange 10 and the top of the container or bowl 13, to form an airtight connection between these parts. The bottom of the bowl is provided with a flow orifice 15 which is aligned with, and preferably of substantially the same size as, the passage in the tubular member 9. A removable bushing 16, of any desired size, is mounted beneath the flow orifice 15 of the bowl or supplemental flow spout, just as in the former practice a similar bushing was mounted beneath the flow orifice of the main flow spout.

The tubular member and bowl, forming the main parts of the supplemental flow spout, can be associated with the main flow spout in any desired manner, and it is to be understood that the invention is in no manner limited to the specific arrangement and construction shown herein, and which will now be described. Numeral 17 refers to a metallic casing, upon the bottom of which rests the bowl 13; the bottom of the casing being provided with a suitable opening to receive the wall of the flow orifice, which preferably projects a slight distance below the metallic casing. The metallic casing 17 is attached to the metallic casing 18 of the main flow spout by any desired means (not shown). The means for attaching the supplemental flow spout to the main flow spout is preferably such that the supplemental flow spout can be tightly clamped against the main flow spout, and also such that the supplemental flow spout can be quickly and easily removed and replaced when desired. It will be apparent that when the metallic casing 17 is drawn upwardly into position the upper end of the bowl 13 will be forced against the packing 14 forming an airtight joint between the bowl and the flange 10; and, likewise, the pressure of the bowl against the flange will compress the packing between the top of the flange and the bottom of the main flow spout or nose block, whereby all of the parts are assembled together in an airtight relation.

The metallic casing 17 is preferably provided with a refractory lining 19, and the space between this lining and the bowl 13 is preferably heated by ordinary burners (not shown) though in some installations this space may be filled with heat insulating material.

It will be noted that the flow orifice 2, tubular member 9, and flow orifice 15, are all aligned one beneath the other, so that there is a free gravity flow of glass directly from the bottom of the flow spout to and through the bushing 16. It will also be particularly noted that the tubular member 9 projects downwardly into the glass in the bowl 13, thereby forming a sealed chamber 20 completely surrounding the tubular member, and into which chamber the glass rises to a certain level. This chamber is referred to herein as a vacuum and pressure chamber. In order to permit the glass to flow into and out of this annular chamber 20, the tubular member 9 ends a short distance above the bottom of the bowl, thereby forming a free but somewhat restricted passage 21 through which the glass can flow back and forth.

The air pressure in the annular chamber, above the glass, is periodically increased above and decreased below atmospheric pressure, as will be described hereinafter. For convenience, these alternate pressures will be referred to herein as vacuum and pressure. Of course the annular chamber communicates alternately with a source of vacuum and a source of pressure, but it is to be particularly noted that no pipe lines are connected to the bowl or to any part of the supplemental flow spout. Such connections would cause delay if, in the case of breakage or wear it becomes necessary to substitute a new unit or to substitute a new part in the unit. It will be apparent that by having the vacuum and pressure chamber formed as a removable unit, its replacement requires only a very few minutes; and this time is further reduced by not having any air lines directly connected with the removable unit. In order to avoid such connections, the pipes 22 which supply air under pressure to the chamber and partially evacuate the air from the chamber, lead to points just above the top of the removable unit, substantially in line with the previously mentioned passages or ports 12 formed in the flange 10. There is an air tight connection between the top of this flange and the bottom of the flow spout, as previously described, so that by reason of the passages 12 the pressure in the chamber 20 is increased and decreased in accordance with the pressures in the pipes, without any direct or positive connection between the pipes and the chamber.

Before describing the operation of the feeder, brief reference will be made to the arrangement of the lines adapted to communicate with sources of pressure and vacuum, to the means for timing the application of pressure and vacuum, etc.; but it is to be clearly understood that the present invention is in no manner limited to any particular construction or arrangement of such parts, as it will be apparent to those skilled in the art that the feeder disclosed herein is adapted to use with any desired timer, pressure and vacuum lines, and other associated parts. Accordingly, the particular construction and arrangement of these parts shown herein, and now to be briefly described, are to be considered merely as illustrative and not in any limiting sense, as the invention resides in the feeder and not in the structure by which communication is opened between the feeder and pressure or vacuum.

Numeral 23 refers to a pressure tank to which air under pressure is supplied by pipe 24 leading from any desired source of pressure. This pipe is preferably provided with a pressure gage 25, and may be provided with an ordinary shut-off valve 26.

Pipe 27 leads from the pressure tank and is divided into two branches, 28 and 29; branch 28 leading to valve 30, and branch 29 leading to valve 31. Two pipes, 32 and 33, lead from valve 30; one of these pipes leading to the front end of cylinder 34 which operates the shears 35 for severing the formed charges or gobs, and the other of these pipes leading to the rear end of the same cylinder.

When the valve spindle 30' of valve 30 is moved in one direction it will admit air through pipe 33 to the rear end of the shear cylinder to close the shears and sever the formed gob; and the valve spindle will immediatly be moved in the opposite direction to admit pressure to the front end of the shear cylinder to open the shears. The valve spindle is moved back and forth at the desired times by a cam 36 keyed or otherwise secured to a revolving shaft 37 driven by any suitable mechanism, usually from the cam shaft of the glass forming machine to which the glass charges are delivered.

Leading from valve 31 is a pipe 38, which connects with a pipe 39, and from this pipe 39 lead the branch pipes 22 which communicate with the interior of the pressure and vacuum chamber 20, through the passages or ports 12. When the valve spindle 31' of valve 31 is moved in one direction air under pressure will flow from the pressure tank 23 to the interior of the chamber 20, and when the spindle is moved in the opposite direction communication will be shut off between the pressure tank and the chamber; the air under pressure remaining in the chamber until communication is opened with a source of vacuum. The valve spindle 31' is moved back and forth at the desired times by a cam 40 keyed or otherwise secured to the revolving shaft 37.

Numeral 41 refers to a vacuum tank in which a partial vacuum is maintained by communication with a factory vacuum line 42. The degree of vacuum is maintained constant by an ordinary pressure regulator 43; and if desired an ordinary hand valve 44 is provided to shut off the vacuum line when the regulator is to be repaired or when operations are to cease. A line 45 leads from the vacuum tank to a valve 46; and leading from this valve is a line 47 which connects with the hereinbefore mentioned line 39 communicating with the interior of the chamber 20 through branch pipes 22 and ports or passages 12. When the valve spindle 46' of valve 46 is moved in one direction communication will be opened between the vacuum tank and the interior of the chamber 20, whereupon the chamber will be vacuumized to the desired degree. When the valve spindle is moved in the opposite direction communication will be shut off between the vacuum tank and the chamber 20; and the chamber will remain vacuumized until communication is opened between the chamber and the pressure tank by the operation of valve 31. Valve spindle 46' is moved back and forth at the desired times by the cam 48 keyed or otherwise fixed to the cam shaft 37.

From the foregoing description of the air and vacuum lines, timer, etc., it will be understood that the air pressure in the chamber 20 is alternately increased and decreased, and that the shears are periodically operated to sever the formed charges of glass, which then drop into the molds of a forming machine (not shown). As mentioned hereinbefore, the operation of the feeder disclosed herein is not dependent upon or limited to any particular apparatus for alternately increasing and decreasing the pressure in the chamber 20, or for operating the shears, etc., for it will be apparent that the feeder is adapted to be used with any desired mechanism for alternately increasing and decreasing the pressure, operating the shears, etc. It being understood that the pressure in the chamber is periodically increased and decreased by any preferred mechanism, the operation of the feeder will now be described.

The glass in the flow spout 1 flows through the flow orifice 2, the volume being regulated by the vertically adjustable plug 3. After the glass leaves flow orifice 2 it has a free gravity flow down through the tubular member 9 and flow orifice 15. The annular pressure and vacuum chamber 20 surrounds and embraces the column of glass flowing downward from the flow spout 1; and communication with the interior of the chamber is permitted by the annular passage 21.

Let it be assumed that the glass flowing downward by gravity from the flow spout 1 has started to emerge through the bushing 16. If the air pressure in the chamber 20 is now increased, by means of any desired apparatus, such as that illustrated herein, some of the glass will be forced from the chamber at a rate greater than ordinary gravity flow, and the flow of glass through the bushing will thus be accelerated, to form the charge or gob. The gobs are severed at the desired instant by the shears 35.

The air pressure in the chamber 20 is reduced at the desired instant, preferably simultaneously with the operation of the shears or immediately thereafter, and the partial vacuum created in the chamber will cause glass to flow thereinto, thus retarding, stopping, or reversing the flow of glass through the bushing, depending, of course, upon the degree of vacuum and the duration thereof. At the proper instant air under pressure is again admitted to the chamber to again accelerate the flow of glass through the bushing, thereby starting another cycle of the feeding operations.

It will be apparent that the present invention includes flowing a column of glass downwardly from a flow orifice in the main flow spout to and through a flow orifice in the supplemental flow spout, and an annular pressure and vacuum chamber arranged above the lower flow orifice and surrounding and embracing the flowing column of glass; the pressure and vacuum chamber functioning to periodically add glass to the downwardly flowing column and thereby accelerating the flow of glass through the bushing, and to periodically draw glass from the column to retard, stop or reverse the flow of glass through the bushing. Thus the action of the alternate pressure and vacuum has a more positive or more direct effect upon the glass charges, thereby giving a more efficient control of the formation of the charges.

It will also be apparent that in case of breakage of any of the refractory parts, such as the tubular member 9 or bowl 13, these parts can be removed as a unit and a new unit substituted in a few minutes. This is of major importance in the operation of glass feeders, as the breakage of a part results in total loss of production until such part has been replaced. It should also be mentioned that the present invention does not require the direct connection between any pipes and the pressure and vacuum chamber or the supplemental flow spout, thereby further reducing the time required for replacing a unit or parts of a unit.

While I have illustrated and described the preferred form of the invention, it will be understood that the broad invention disclosed is subject to many changes and modifications, all of which I aim to include within the scope of the appended claims.

What I claim is:

1. A glass feeder including a flow spout having a submerged flow orifice in its bottom, a chamber arranged beneath the flow orifice and having a vertical passage for the flow of glass aligned with the flow orifice, means leading to a point adjacent said chamber for periodically supplying pressure to and withdrawing pressure from said chamber, and means independent of the first-mentioned means leading therefrom to said chamber for providing communication between the first-mentioned means and the chamber, whereby the chamber can be removed without disconnecting the first-mentioned means.

2. A glass feeder including a flow spout having a submerged flow orifice in its bottom, a chamber removably mounted against the bottom of the flow spout, said chamber having a passage for the flow of glass in substantial alignment with the flow orifice, an air line leading to a point adjacent said chamber, and means independent of said air line leading therefrom to said chamber, for providing communication between the air line and the chamber, whereby the chamber can be removed without disconnecting the first-mentioned means.

3. A glass feeder including a flow spout having a flow orifice in its bottom, a bowl having a flow orifice in its bottom arranged below and containing glass received from the first-mentioned flow orifice, a tubular member projecting downwardly from the flow orifice into the glass in the bowl, said tubular member stopping a short distance above the bottom of the bowl and spaced inward of the bowl to form a glass chamber surrounding the tubular member, into which chamber the glass is free to flow laterally and upward, and means for periodically increasing and decreasing the air pressure on the glass in said glass chamber.

4. A glass feeder including a flow spout having a submerged flow orifice in its bottom, a bowl or container arranged below the flow orifice and containing glass received therefrom, said bowl having a flow orifice in its bottom, a tubular member extending downwardly from the first-mentioned flow orifice into the glass in the bowl and stopping short of the bowl bottom, the wall of said bowl being spaced from the tubular member to form an annular space surrounding the tubular member into which space the glass rises freely, and means associated with the annular space for periodically varying the air pressure above the glass therein.

5. A glass feeder including a flow spout having a submerged flow orifice in its bottom, a tubular member extending downwardly from the flow orifice, said tubular member having a flange at its upper end arranged against the bottom of the flow spout, a bowl or container surrounding said tubular member and having a flow orifice in its bottom, the wall of the bowl being spaced laterally from the tubular member and the bottom of the bowl being spaced below the lower end of the tubular member, whereby glass may rise freely into the space surrounding the tubular member, and means for periodically varying the air pressure above the glass in such space.

6. A glass feeder including a flow spout having a submerged flow orifice in its bottom, a tubular member extending downwardly from the flow orifice, said tubular member having a flange at its upper end arranged against the bottom of the flow spout, a bowl or container surrounding said tubular member and having a flow orifice in its bottom, the wall of the bowl being spaced laterally from the tubular member and extending upwardly into airtight engagement with said flange, the bottom of the bowl being spaced below the lower end of the tubular member, whereby glass may rise freely into the space surrounding the tubular member, and means for periodically varying the air pressure above the glass in such space.

7. A glass feeder including a flow spout having a submerged flow orifice in its bottom, a bowl or container arranged below the flow orifice and having a flow orifice in its bottom aligned with the first-mentioned flow orifice, a flange extending inwardly from the top of the bowl wall, a tubular member projecting downwardly from said flange in alignment with the two flow orifices and stopping short of the second-mentioned flow orifice, and means for periodically varying the air pressure in the space between the tubular member and the bowl wall.

8. A glass feeder including a flow spout having a submerged flow orifice in its bottom, a bowl or container arranged below the flow orifice, said bowl having a flow orifice in its bottom, a tubular member extending downwardly from the first-mentioned flow orifice and stopping short of the bowl bottom to form a lateral passage for the glass, a glass chamber communicating with the lateral passage and enlarged with respect thereto, and means for periodically varying the pressure of the air directly on the glass in said chamber.

JAMES W. ROSS.